UNITED STATES PATENT OFFICE.

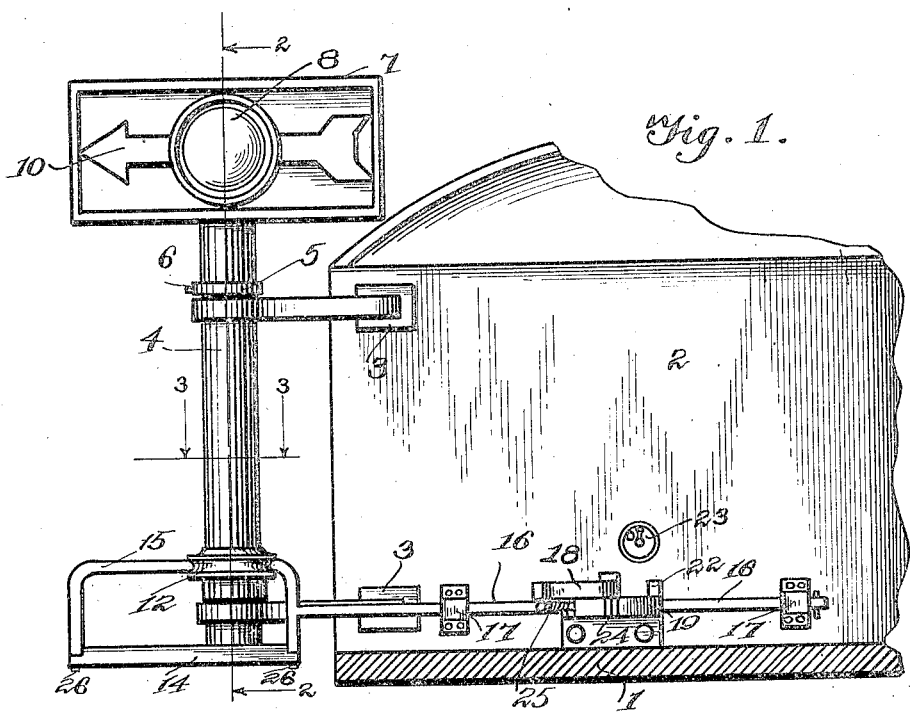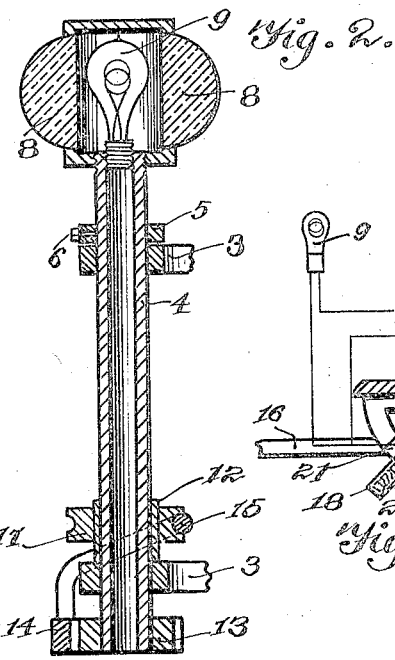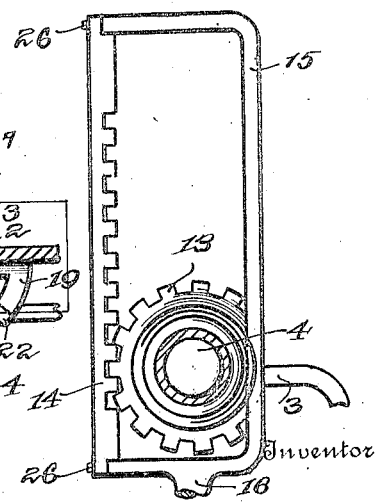

HARVEY P. NOBLE, OF PHILADELPHIA, PENNSYLVANIA, ASSIGNOR OF ONE-HALF TO EDWIN C. OTT, OF PHILADELPHIA, PENNSYLVANIA.

SIGNALING DEVICE FOR AUTOMOBILES.

1,076,443.  Specification of Letters Patent.  Patented Oct. 21, 1913.

Application filed March 29, 1912. Serial No. 687,041.

*To all whom it may concern:*

Be it known that I, HARVEY P. NOBLE, a citizen of the United States, residing at Philadelphia, in the county of Philadelphia and State of Pennsylvania, have invented certain new and useful Improvements in Signaling Devices for Automobiles, of which the following is a specification.

My invention relates to improvements in signaling devices for automobiles, the object of the invention being to provide a device of this character which may be readily attached to an automobile or other vehicle, and which will indicate to those in the rear, the direction in which the automobile is to turn.

A further object is to provide an improved device of this character which is of extremely simple, inexpensive construction, and which may be readily attached to any machine in use, and will operate with efficiency in the night time as well as in the day.

With these and other objects in view, the invention consists in certain novel features of construction and combinations and arrangements of parts, as will be more fully hereinafter described and pointed out in the claims.

In the accompanying drawings: Figure 1,
is a view in section through the front portion of an automobile illustrating my improvements attached to the dash board thereof. Fig. 2, is a view in section on the line 2—2 of Fig. 1. Fig. 3, is a view in section on an enlarged scale on the line 3—3 of Fig. 1, and Fig. 4, is a diagrammatic plan view illustrating the electric circuit controlling the light and the signal.

1, represents an automobile platform, and
2 the dash board thereof to which laterally projecting brackets 3 are secured, and support a vertically positioned tubular shaft 4. This shaft 4 is mounted to turn, and is held against longitudinal movement by means of a collar 5 secured thereon by a set screw 6.

On the upper end of the tubular shaft 4, a rectangular metal casing 7 is located, and is provided centrally at opposite sides with bull's-eye lenses 8. An electric lamp 9 is provided in the casing 7, between the lenses 8, and is preferably screwed into the upper end of tubular shaft 4. On the opposite side of the casing 7, arrows 10 are formed in some way, as for example, by painting thereon to indicate direction, while the lenses 8 will preferably be differently colored in accordance with any well known system of signaling to indicate the direction which the automobile is to take.

Above the lower bracket 3, a pulley 11 is provided, and is fixed to a tube 12 which is mounted to turn on shaft 4. A pinion 13 is secured to the lower end of the shaft 4, and is engaged by a rack 14. This rack 14 is secured to a frame 15, so that the rack and the frame constitute a rectangular structure positioned at an incline with the frame 15, bearing against the pulley 12, while the rack bar 14 engages pinion 13. It will be seen that the pulley 11 is provided with a grooved periphery and that the frame 15 moves through the groove of the pulley, so that the pulley serves to regulate the engagement of rack bar 14 with the pinion, insuring a uniform engagement of the teeth regardless of any vibrating movement of the automobile. To hold this frame in such a position, a bar 16 is provided, and is preferably integral with the frame, and this bar 16 is angular in cross section, and moves through angular guides 17 on the dash board 2.

A foot lever 18 is fulcrumed in a segmental bracket 19, and is pivotally connected to bar 16 by a slot and pin connection 20, so that when the foot lever 18 is swung from side to side, the rack 14 will cause the pinion 13 and shaft 4 to turn so as to change the position of the signal.

Electric contacts 21 and 22 are provided on the segmental bracket 19, and are insulated therefrom, and these contacts are included in electric circuit with a switch 23 and battery 24ª, and the lamp 10, so that when the lever 18 is swung to either extreme position, the circuit will be closed so that the lamp will be lighted. When, however, the lever is at an intermediate position, the lamp will be extinguished, and in this position the sign will be extending front and rear so as not to show from in rear of the machine.

To hold the lever 18 in its various positions, the central bracket 19 is made with beveled notches 24, and a spring-pressed detent 25 is provided on the lever and is adapted to ride into and out of these notches. It will, therefore, be understood that while Fig. 1 shows the signal in a position to indicate that the automobile is to turn to the left, by swinging the foot lever 18 to the central notch, the sign will be turned so that it will not indicate direction. In other words, it will be positioned longitudinally of the automobile. By turning the foot lever either way, the sign may therefore be turned to indicate the direction the automobile is to take.

The construction of frame 15 and rack 14 enables an easy transmission of motion from the lever 18 to the shaft 4, and as the rack bar 14 is removably secured at its ends to frame 15 by screws 26, this rack bar can be readily removed and replaced should the teeth become broken.

While the lamp, of course, is used at night, during the day time the switch 23 will be thrown so as to open the electric circuit, and allow the device to be operated without employing the light.

By constructing my improvements as set forth, and locating the same at one side of the automobile, the signal may be seen from the front as well as from the rear of the car, so that it may be an indicator to cars approaching from the front as well as from the rear.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a vehicle, of brackets projecting to one side of the vehicle adjacent the front end thereof, a shaft mounted in said brackets, a casing on the upper end of the shaft, openings in the front and rear face of said casing, lenses in said openings, a signal light in the casing between the lenses, whereby the signal is shown both front and rear, a pinion on the lower end of the shaft, a pulley on the shaft, a rectangular frame engaging the pulley at one side of the shaft, a rack on the frame engaging the pinion on the other side of the shaft, and means for moving the frame, substantially as described.

2. The combination with a vehicle, of brackets projecting to one side of the vehicle adjacent the front end thereof, a shaft mounted in said brackets, a casing on the upper end of the shaft, openings in the front and rear face of said casing, lenses in said openings, a signal light in the casing between the lenses, whereby the signal is shown both front and rear, a pinion on the lower end of the shaft, a pulley on the shaft, a rectangular frame engaging the pulley at one side of the shaft, a rack on the frame engaging the pinion on the other side of the shaft, a foot lever, and a bar connecting said frame with said foot lever, whereby the movement of the foot lever causes the rotation of the shaft, substantially as described.

3. The combination with a vehicle, of brackets projecting to one side of the vehicle adjacent the front end thereof, a shaft mounted in said brackets, a casing on the upper end of the shaft, openings in the front and rear face of said casing, lenses in said openings, a signal light in the casing between the lenses, whereby the signal is shown both front and rear, a pinion on the lower end of the shaft, a grooved pulley on the shaft, a rectangular frame engaging in the groove of the pulley at one side of the shaft, a rack on the frame engaging the pinion on the other side of the shaft, and means for moving the frame, substantially as described.

In testimony whereof I have signed my name to this specification in the presence of two subscribing witnesses.

HARVEY P. NOBLE.

Witnesses:
   EDWIN G. OTT,
   CHARLES E. POTTS.